(12) United States Patent
Gollnik

(10) Patent No.: US 6,510,644 B1
(45) Date of Patent: Jan. 28, 2003

(54) DEER TAIL DECOY

(76) Inventor: Bradley D. Gollnik, N4478 State Rd. 162, Bangor, WI (US) 54614

( * ) Notice: Subject to any disclaimer, the term of this patent is extended or adjusted under 35 U.S.C. 154(b) by 0 days.

(21) Appl. No.: 09/976,868

(22) Filed: Oct. 12, 2001

(51) Int. Cl.$^7$ .............................................. A01M 36/06
(52) U.S. Cl. ................................................... 43/2; 43/1
(58) Field of Search ....................... 43/2, 1, 3; 116/173, 116/280, 278; 119/57.91; 40/604; 244/153 R

(56) References Cited

U.S. PATENT DOCUMENTS

| | | | |
|---|---|---|---|
| 4,268,918 A | * 5/1981 | Lee | ................ 2/172 |
| 4,773,178 A | 9/1988 | Marek | |
| 4,890,571 A | * 1/1990 | Gaskill | ............. 43/2 |
| 325,617 A | 4/1992 | Smith | |
| 5,191,730 A | * 3/1993 | Balmer | ............. 43/2 |
| 5,244,715 A | * 9/1993 | Kuchar | ........ 116/173 |
| 5,333,572 A | 8/1994 | Nutt | |
| 5,335,438 A | * 8/1994 | Terrill | ............. 43/1 |
| 5,417,601 A | * 5/1995 | Steiger | .......... 446/28 |
| D370,972 S | 6/1996 | Dutton | |
| 5,546,692 A | 8/1996 | Byers | |
| 5,791,081 A | 8/1998 | Turner et al. | |
| 6,050,017 A | 4/2000 | Barry | |

FOREIGN PATENT DOCUMENTS

CA        002047568    *  1/1993   ..................... 43/2

* cited by examiner

Primary Examiner—Peter M. Poon
Assistant Examiner—Joan M. Olszewski
(74) Attorney, Agent, or Firm—M. Paul Hendrickson

(57) ABSTRACT

There is provided a deer tail decoy which simulates the communicating and motion characteristics of a deer's tail. The decoy includes flexible and paired front and rear tail-shaped light colored background and dark inlaid materials, each of which is frayed or slit about their peripheral margins to provide contrasting inner and outer flaps which flutter in the wind. The top section of the decoy includes a rigid support such as a wire so as to permit the decoy to flag in the wind. When secured to a mounting site with a cord or wire, the wind blown deer tail decoy partially rotates about the wire, swings as a pendulum, ripples through its entire fabric structure and creates contrasting fluttering and flapping in the wind so as to emulate a deer's tail in motion.

5 Claims, 5 Drawing Sheets

DEER TAIL DECOY

FIELD OF THE INVENTION

The present invention relates to decoys and more particularly to deer tail decoy and its use.

BACKGROUND OF THE INVENTION

Heretofore, numerous decoys for attracting deer have been proposed. Most of these decoys attempt to replicate the deer with the tail portion being only a small part of the over-all design. For example, U.S. Pat. No. 5,546,692 to Byers disclose a deer decoy comprising a plastic body having opposed sides, each side simulating the rear end of a standing deer. A tail is associated with each side. The tails are mounted on a common shaft for bodily rotation about an axis near their upper ends such that the tails are gravitationally biased to normally hang in a position simulating a natural relaxed condition of repose. An exterior pull string and/or a mechanism within the body is controlled to move the tail relative to said body out of the repose position. The body is made of solid foam plastic or hollow and of two substantially identical halves joined together. The deer decoy body includes recesses defining downwardly open channels along each leg portion of the body rear end and a rod is telescoped in each channel for engaging the ground to support the decoy in standing position spaced above the ground. The decoy is three-dimensionally sculptured to lifelike scale along X and Y dimensional coordinate axes at a scale greatly reduced form the X-Y scale along main decoy viewing Z axis so as to appear abnormally thin when viewed along the Z axis.

U.S. Pat. No. 5, 791,081 to Turner, et al disclose a deer decoy for attracting an animal such as a deer into close proximity of a waiting hunter. The device includes a deer shaped main body member including a head portion and a rear portion. A pair of ear members are rotatably mounted to the head portion and are rotatable between a friendly position and a challenging position. A tail member is pivotally mounted to the rear portion and is pivotable between a first position and a second position to simulate the tail movement of a live animal.

U.S. Pat. No. 6,050,017 to Bany et al disclose a flexible, self-supporting decoy for wild game which requires no wind to inflate and which maintains its shape even under heavy dew or rain showers. When used for birds, the decoy may comprise as few as three pieces, namely, a stake, a windsock-type body of flexible yet self-supporting material, and a fastener. The body may be rotatably supported about a stake by the simple expedient of an opening in the lower portion of the body large enough to pass over the stake and a second opening in the upper portion too small to pass over the stake but large enough to receive a fastener with a head or flange large enough to secure the body. Such decoys may be quickly collapsed for transporting or quickly unfurled for decoying, will move with the wind, and are lightweight, durable and effective.

U.S. Design Pat. No. 325,617 to Smith discloses a design for a deer tail decoy, employing a deer tail apparatus which is bolted onto a surface, to simulate the presence of a deer, which oscillates up and downward in the wind.

U.S. Design Pat. No. 370,972 to Dutton discloses a design for a solid deer decoy using the whole portion of the deer and what appears to be a rigid tail design.

Notwithstanding numerous attempts to create deer decoys more effective in attracting the attention of deer, the current decoys fail to effectively simulate the movement of a deer tail to a sufficient degree to attract and maintain the attention of deer.

SUMMARY OF THE INVENTION

The present invention provides a deer tail decoy possessing an enhanced efficacy in attracting and maintaining the attention of deer. The deer tail decoy is relatively inexpensive to manufacture and is designed so as to simulate the social communication of a deer's tail and the natural movement of a deer's tail. The deer tail decoy comprises a standard support for supporting, a flexible light colored background pattern, and an inner dark inlaid pattern bordered by the outer light background pattern. The outer lighter colored background pattern and the inner dark inlaid colored pattern have a plurality of marginal cuts about their respective peripheral margins to create inner and outer flaps which are designed so as to flutter upon movement by wind. When mounted to a supporting site with a connective support, the decoy upon wind motion swings as a pendulum, rotates about its axial mount, ripples throughout its flexible structure and provides contrasting, flapping imagery, all of which emulate the natural movements of a deer's tail.

The decoy may be rolled or folded and is easily stowable in a hunter's pocket. If desired, multiple decoys could be carried in a single pocket. It is safe and presents little chance of injury to the user. The deer decoy effectively emulates the social communication and natural hair-like movement of a deer's tail in motion without any attendant mechanical sound when activated. The deer tail decoy arouses the natural curiosity of deer and maintains the attention of deer to allow the hunter to more effectively target the animal.

DESCRIPTION OF THE INVENTION

Figure 1:
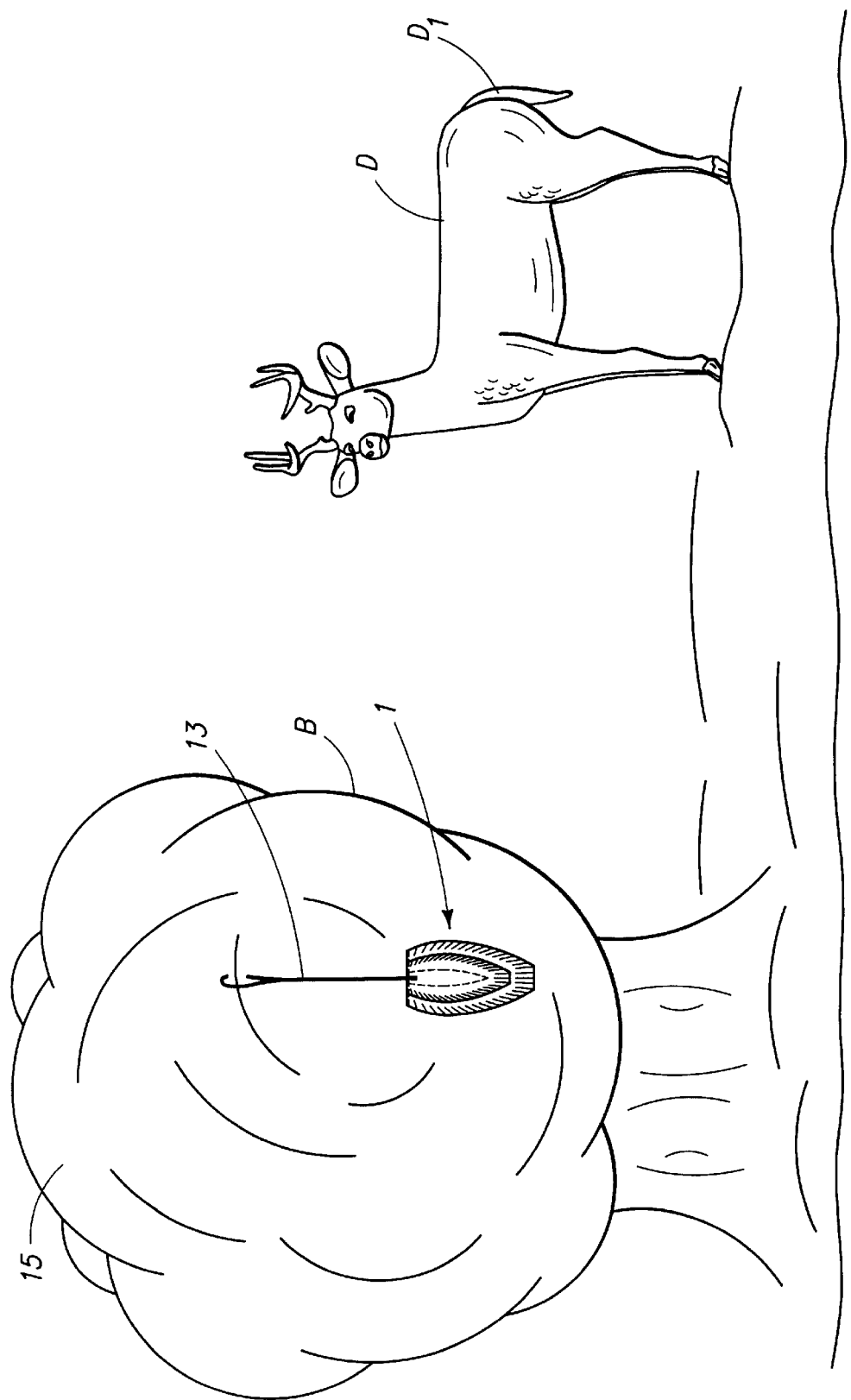
FIG. 1 is a perspective view depicting a deer tail decoy of this invention suspended from a bush and attracting the attention of a deer to the decoy.

The present invention provides an animal tail decoy (generally represented as 1) which effectively emulates the movement of a deer tail $D_1$ in motion. The animal tail decoy 1 upon exposure to air currents or wind simulates those motions created by the movement of the tail $D_1$ by animal D. The animal tail decoy 1 comprises a support or standard member 2, a flexible background material 3 having a top section $3_T$ planarity secured to the support member 2 and a bottom section $3_V$ of an arcuate shape containing a multiplicity of outer arcuate slits 11 positioned about a peripheral margin 4 of the bottom section $3_V$ to form a multiplicity of outer flaps $11_F$ which are adapted to independently flutter in the wind, and a flexible inner part 7 of a contrasting color juxtapositioned within the peripheral margin 4 of said bottom section $3_V$ with said flexible inner part 7 forming an arcuate configuration having a plurality of inner flaps $9_F$ arcuately aligned along a peripheral border 8 of the flexible inner part 7 and secured at an internally disposed position relative to the bottom section $3_V$ so as to permit the multiplicity of outer flaps $11_F$ and the plurality of inner flaps $9_F$ of the contrasting color to independently flutter in the wind and thereby simulate the effects of an animal tail $D_1$ in movement under wind blown conditions. The flexible background material 3 and the inner part 7 are fabricated from flexible materials which are capable of undergoing an undulating or rippling effect similar to that of a flag when exposed to a crosswind. Flexible materials such as natural and synthetic fabrics, plastic films, treated paper and the like may be advantageously used for this purpose. The flexible background material 3 and the flexible inner part 7 preferably consists essentially of cloth fabrics of both natural and synthetic origins. Since cotton generally possesses exceptional fluttering characteristics in wind, fabrics containing cotton are particularly satisfactory for use herein.

Figure 2:
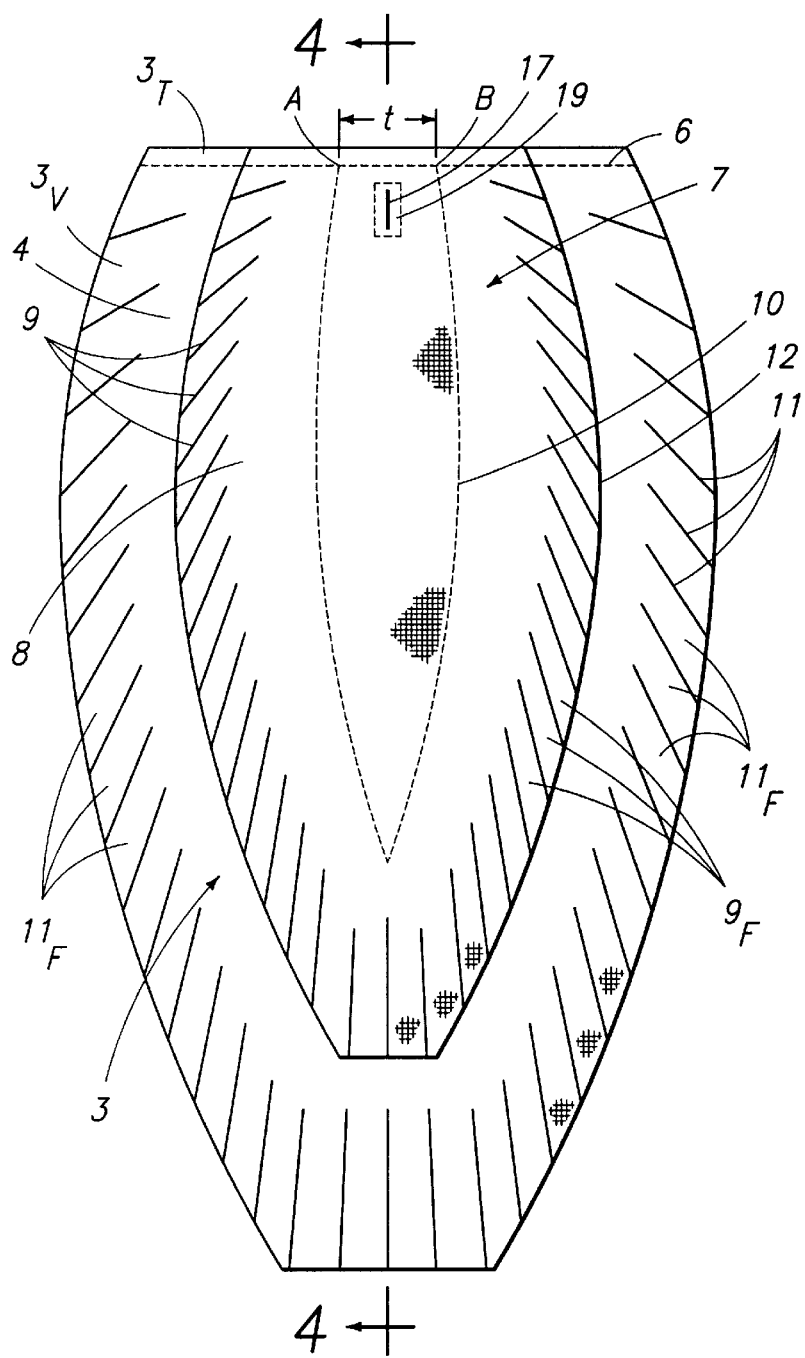
FIG. 2 is a frontal view of deer tail decoy shown in FIG. 1.

It is generally well accepted that deer are color blind and, therefore, incapable of distinguishing colors. Deer appear to recognize light and dark shades of color and movement. Thus, the flexible materials of the background material 3 and the inner part 7 used herein should be of a light and dark color to provide the appropriate shaded contrast so as to attract the attention and curiosity of deer D. The flexible background material 3 preferably comprises a white cloth fabric and the flexible inner part 7 preferably comprises a brown colored fabric. The decoy 1 is preferably of a vase-shaped pattern having a substantially flat top section $3_T$ and arcuate bottom section $3_V$ which simulates the color, shape and appearance of a tail $D_1$ of a white tail deer D. The brown colored inlaid cloth fabric of the inner part 7 is stitched by bottom section stitches 10 onto the white colored cloth fabric of the background material 3 at a recessed margin from inner flaps $9_F$. The outer peripheral border 12 of inner part 7 is set back sufficiently so as to permit the inner flaps $9_F$ and the outer flaps $11_F$ to independently flutter when subjected to a blowing wind. Inner flaps $9_F$ are accordingly positioned at a sufficient distance from slits 11 so as not to hinder the independent movement of either outer flaps $11_F$ or inner flaps $9_F$. Inner flaps $9_F$ may be positioned in closer proximity to the terminating end of slits 11 than is depicted in FIG. 2 provided the fluttering effect is not unduly hindered. Inner flaps 9F may be positioned in an overlapping position to outer flaps 11F to the extent that the overlapping does not interfere with the desired contrasting movements thereof The positioning of the outer and inner flaps (11F and 9F) should nonetheless allow for substantial independent motion of both the outer and inner flaps 11F and 9F.

In greater particularity, decoy 1 preferably includes a support bar or standard member 2 and a larger background material 3 such as the cloth pieces 3a and 3b and inner cloth piece and an the inner part 7 of smaller contrasting inlaid cloth pieces 7a and 7b cut and sewn together in such a manner so that when the decoy 1 is suspended from an elevated mounting site 15 with a supporting connector 13 (such as a cord or wire shown in FIG. 1), wind movement of decoy 1 will cause the flaps ($9_F$ and $11_F$) to flutter and emulate the effect of a deer tail $D_1$ in movement. The suspensions of decoy 1 upon a mounting site 15 (depicted as bush B) with supporting connector 13 creates, in wind, a pendulum motion, an oscillating axial motion about supporting connector 13, an undulating or rippling motion throughout the fabric of the background material 3 and inlaid flexible inner part 7 and an independent fluttering motion of inner flaps 9F and outer flaps 11F. The ability to accomplish these complex motions rests, in part, in the stitching or sewing together a dark colored vase-shaped pattern of the flexible inner part 7 onto a lighter colored vase-shaped pattern of the flexible background material 3 with bottom section stitches 10 and top section stitches 6. Slits 9 and 11 may be cut before or preferably after the inlaid pieces 7a and 7b and background material 3a and 3b are sewn together. The stitched pieces, the flexible inner part 7 and the flexible background material 3 replicate the shape of a deer tail $D_1$. The inner slotted flaps $9_F$ about the peripheral boarder 8 of the darker inlay piece, flexible inner part 7 and the outer slotted flaps $11_F$ of the white outer peripheral margin 4 flutter and flash in the wind so as to emulate the hair and movement of a deer tail in motion. A support member 2 such as a wire base or other rigid support base is stitched by top section stitches 6 across the top margin of the decoy 1 so as to provide a relatively rigid support for mounting the decoy 1 onto a suitable elevated mounting site 15. A relatively stiff wire used as a support member 2 enhances the flapping of the decoy 1 in wind. The stiff wire support member 2 in combination with a corresponding supporting connector 13 such as a stove pipe wire strung through wire support aperture 17 upon elevated mounting site 15 allows for a partial rotational and pendulum movement of the decoy 1 in wind.

The cuts or slits of outer and inner slits (11 and 9) along the outer margins of the peripheral margin 4 and the peripheral border 8 on both the dark pattern of the inner part 7 stitched inlay and upon the white border piece of the background material 3 are positioned so as to simulate hair movement in wind and the flashing effect of a deer tail $D_1$ in motion. It may be observed from the figures that cuts or slits (11 and 9) extend along the bottom margins (e.g. $3_M$ and $7_M$ of FIG. 5) and then slanted upwardly at an inclining angle along the side margins (e.g. see $3_S$ and $7_S$ of FIG. 5) so that the flared cuts (11 and 9) create outer flaps $11_F$ and inner flaps $9_F$ which more effectively emulate a deer tail in motion. The bottom margins ($3_M$ and $7_M$) of each piece are provided with cuts along the bottom in vertical alignment with the longitudinal axis of decoy 1. The darker or brown background of inner part 7 is sewn upon the white background material 3 with stitching of bottom section stitches 10 (so as to leave an open margin or peripheral border 8) therefore to provide the support of inner flaps $9_F$ and outer flaps $11_F$. It may be observed from the figures (particularly FIG. 2) that the margining peripheral border 8 of the dark inlaid piece of inner part 7 as well as the margining border 4 of the white or lighter background material 3 are free for movement in the wind since bottom section stitches 10 are substantially recessed from the outermost border 12 of inner part 7. Similar to the movement of the hair upon a deer tail, the wind creates a flashing and fluttering contrast of the fluttering dark inner flaps $9_F$ against white outer flaps $11_F$ so as to emulate the movement and appearance of a deer tail $D_1$. The decoy 1 is accordingly highly effective in attracting and maintaining the curiosity of the deer D as illustrated in FIG. 1. As illustrated in FIG. 1, the decoy 1 is best mounted at a mounting site 15 upon an extended support background such as a pine tree or bush (B) so as to occlude interfering background movements and provide a bold background for visual contact of the deer decoy 1 by deer D.

Figure 3:
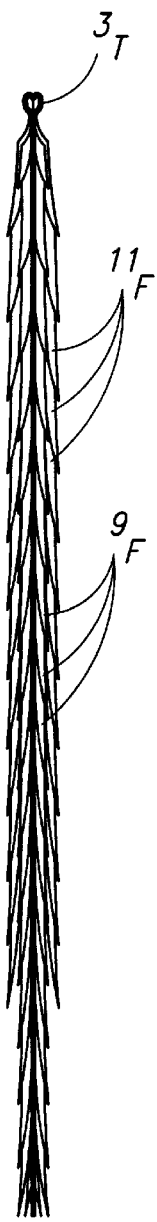
FIG. 3 is a side view of the deer tail decoy shown in FIG. 2.
Figure 4:
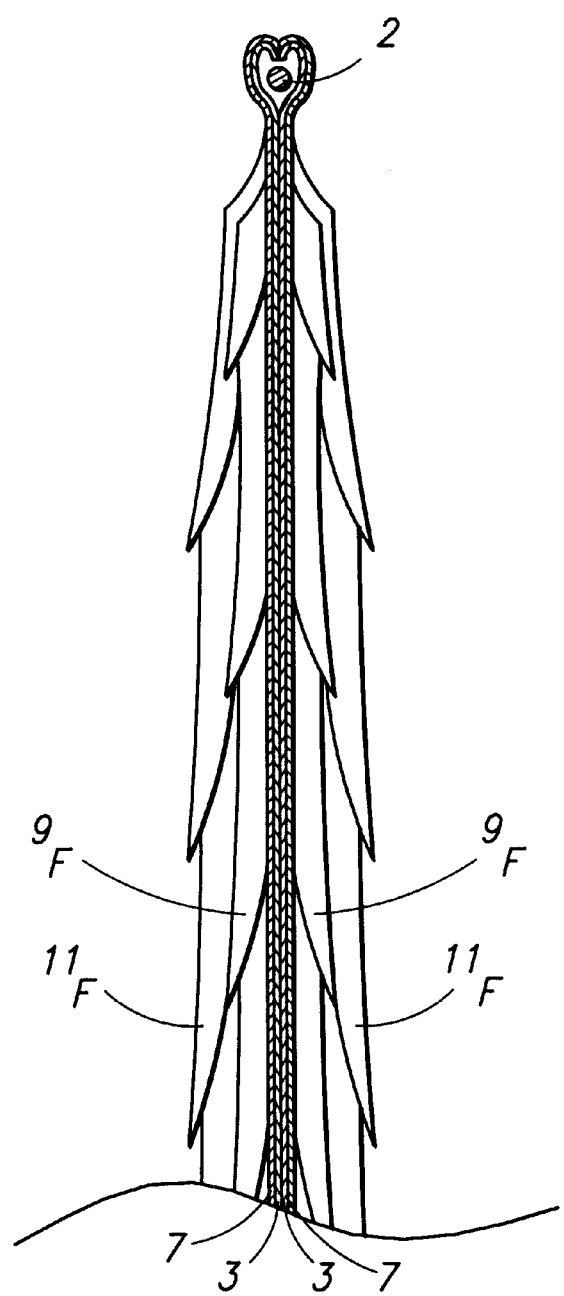
FIG. 4 is a cross sectional view taken along line 4—4 of FIG. 2.
Figure 5:
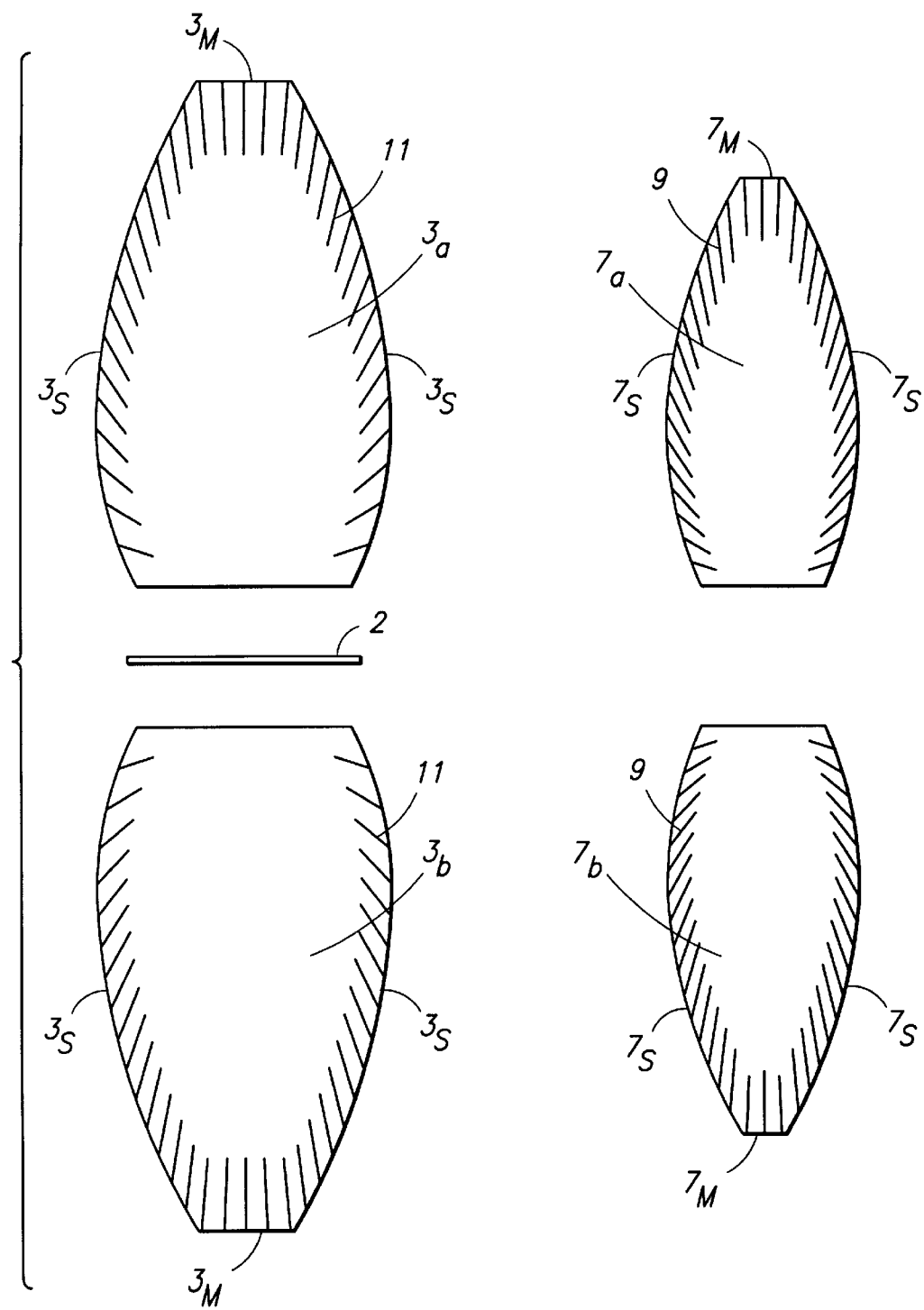
FIG. 5 is a frontal view of the disassembled pieces of the deer tail decoy.

As illustrated, the invention generally comprises mating at least one flexible light background pattern of background material 3 and a flexible dark surface of the inner part 7 sewn together in a frontal and a rear positioning with slanted and oblique cuts (9 and 11) along the respective dark flap side margins $7_S$ and the light flap side margins $3_S$ to create flaps $9_F$ and 11F which in part emulate the movement of a tail $D_1$ in wind. In one of the preferred embodiments, the deer tail decoy 1 as shown in FIG. 5 comprises four cloth pieces (3a, 3b, 7a and 7b) for the background material 3 and the inner part 7 cut in a vase-like fashion with two of the pieces (7a and 7b) being of a dark color, preferably brown, and two other pieces of the background material 3 (3a and 3b) of lighter colors, preferably a white. The light pieces (3a and 3b) of the background member 3 and inlaid dark pieces (7a and 7b) of the inner part 7 are sewn together as illustrated by FIGS. 2–4 to provide a mirror image of the front and back side leaving room for a sleeve section of top section $3_T$ for inserting the support member 2. The peripheral margin 4 and the peripheral border 8 (4 and 8) of both the light and brown cloth pieces of background material 3 and inner part 7 (3a, 3b, 7a and 7b) must be slit to provide flaps which wiggle or flutter and appear hair-like when decoy 1 is blown in the wind. It should be noted that the angle of the cuts (9 and 11) on both the inside and outside of the decoy 1 are designed so as to very closely simulate the movement of light and dark colors of the deer tail D upon movement. The cuts (9 and 11) are straight cut along the bottom margins $3_M$ and $7_M$ and then along the vertical edges or side edges $3_S$ and $7_S$ cuts 9 and 11 are slanted upwardly and inwardly. When the contrasting pieces (3a, 3b, 7a and 7b) of background material 3 and inner parts 7 are sewn together along their respective inner margins so that the outside margins of both the light and darker pattern of the peripheral margin 4 and the peripheral border 8 will then flutter in the wind. Decoy 1 includes a support standard member 2 and a mounting wire of suspending connector 13 for mounting decoy 1 upon a suitable support or elevated mounting site 15 such as bush B illustrated in FIG. 1. As may be observed particularly in FIG. 2, a wire support aperture 17 in the form of a slit or cut through both pieces of the background member 3 and inner part 7 re-enforced with wire aperture stitching 19 affords not only a means for mounting the deer decoy 1 to mounting site 15 but also a highly effective central positioning of the decoy 1 so as to hold the decoy 1 in a wind receiving posture. This permits decoy 1 when wind blown to rotate back and forth about the axis of its suspension (i.e. wire support of suspending connector 13), swing as a pendulum about its mounting site 15, while the suspended flexible structure creates a contrasting, randomized undulating and flapping motion for communication to and attracting the attention and curiosity of animal D.

It is necessary to provide contrasting lighter and darker colors or shades which when placed in motion create an attractive perception for the animal D Deer's eyesight is relatively poor, without any appreciable ability to distinguish between different colors, but there exists an ability recognize light and dark contrasts. Deer also possess an exceptional ability to perceive motion. The decoy 1 of this invention optimizes and capitalizes upon the necessary attracting motions for attracting and maintaining the attention and curiosity of a deer D. It is necessary for the outer and inner flaps ($11_F$ and $9_F$) to maintain a radial extending position about the peripheral margins of the respective pieces of the background member 3 and the inner part 7, thus as the overlaying dark inner flaps $9_F$ flutter in connection with light outer flaps $11_F$ the necessary contract and hair-like flashing motions occurs. The outer flaps $11_F$ and inner flaps $9_F$ may alternatively be constructed of three dimensional synthetic fibrous materials (cylindrical, triangular, tubular, etc.) having sufficient structural integrity to maintain a radial projection about the outer periphery of the light and dark background pieces 3 and 7. The width of the outer flaps $11_F$ and inner flaps $9_F$ of such three dimensional materials may be of a correspondingly smaller cross section in width than those derived from planear materials such as cloth. Upon the basis of costs and efficacy, outer and inner flaps ($11_F$ and $9_F$) are preferably fabricated from flexible flat planear materials such as cloth and plastics. Both the inner $9_F$ and outer $11_F$ flaps should possess sufficient structural strength so as to maintain their respective radial projecting orientation (i.e. without substantial drooping). The depth of the slits 11 and 9 and corresponding depth of the inner flaps $9_F$ and outer flaps $11_F$ may suitably range from about 1 cm to about 10 cm in length. Advantageously, inner flaps $9_F$ and outer flaps $11_F$ will range from about 2 cm to about 6 cm in length and, most preferably, from about 3 cm to about 5 cm in length.

Depending upon material construction, inner flaps $9_F$ and outer flaps $11_F$ measuring from about 1 mm or more for three dimensional construction and 20 mm or more for other materials may be used herein. As previously indicated, the most suitable width of the inner flaps $9_F$ and outer flaps $11_F$ depends upon the flexibility of the material from which the flap is constructed. The most appropriate width of flaps inner flaps $9_F$ and outer flaps $11_F$ will depend in part to the projecting rigidity of the material used. The outer flaps $11_F$ and inner flaps $9_F$ width should be designed so as to permit the outwardly projecting inner flaps $9_F$ and outer flaps $11_F$ to flutter in the wind. For decoys made of cotton and blended cotton fabrics, the broader cuts enable flaps inner flaps $9_F$ and outer flaps $11_F$ to maintain their desired projecting radial orientation without substantial drooping. In contrast, flaps of lesser cross sectional width may be relied upon for those materials of a more rigid and less flexible structure than cotton and cotton cloth blends such as canvas. The same guidelines generally apply when plastic films are used to fabricate outer flaps $11_F$ and inner flaps $9_F$. The thicker plastic films will general maintain radial orientation at thinner widths than those of a lesser thickness. Particularly effective motion and contrasting effects may be accomplished with cloth outer flaps $11_F$ and inner flaps $9_F$ measuring greater than about 0.2 cm and less than 2 cm in width, and most preferably, from about 0.5 cm to about 1.5 cm. Inner flaps $9_F$ and outer flaps $11_F$, having a width of about 1 cm provide a particularly effective contrasting and motion imagery to attract and maintain the curiosity of deer D.

EXAMPLE

A deer tail decoy 1 of the configuration shown in FIG. 2 was facricated as illustrated in FIG. 5 from two pieces (3a and 3b) of soft white cotton (100%) cloth as background material 3 for both the front and back side of decoy 1, a blend of 65% polyester and 35% cotton cloth fabric serving to provide two cut inner part 7 of pieces 7a and 7b of inner brown fabric for inlay within background member pieces 3a and 3b on both decoy sides, a 14 centimeter in length No. 8 gauge stovepipe wire, as support member 2 and an 8 gauge stovepipe wire 15 inches in length as a suspending connector 13 (as illustrated in FIG. 1). The white (3a and 3b) and brown cloth pieces (7a and 7b) were cut from a pattern of a configuration as illustrated in FIG. 5. The white background cloths pieces (3a and 3b) measured 14 cm along the top section $3_T$, bulging to a maximum width of about 19 cm, and then tapering to about 8 cm width along the bottom margin $3_M$; and measured about 35.27 cm in length. The brown cloth pieces 7a and 7b measured about 6.5 cm along the uppermost edge, slightly more than 12 cm at its broadest bulge width, tapering to about a 3 cm width along bottom margin $7_M$; and measured about 28 cm in length. Pieces 3a and 3b were mated in a back-to-back relationship and pinned together after which piece 7a was pinned onto the surface of piece 3a and piece 7b was pinned onto piece 3b with all of the top edges of all the pieces being 3a, 3b, 7a and 7b aligned together. The top section $3_T$ of the pieces 3a, 3b, 7a and 7b were overlapped onto one another along the top edges. The white cloth pieces 3a and 3b and overlaying brown cloth pieces 7a and 7b were then stitched together along the top section to provide top section stitches 6 while $3_T$ allowing sufficient distance to provide a channel inserting for the support member stovepipe wire 2 therein. Pinned pieces 3a, 3b, 7a and 7b were then stitched from the top section stitches 6 towards the bottom margin $7_M$ of the brown pieces 7a and 7b with a lateral stitching measuring about 2 cm apart (between A and B) along the uppermost spacing "t" and about 3 cm at its broadest lateral spacing to provide bottom section stitches 10 as depicted in FIG. 2. A reinforcement seam of aperture stitching 19 for a wire support aperture 17 was then stitched slightly beneath the middle of top section $3_T$ as shown in FIG. 2 with a slitting of a slot to provide a wire support aperture 17 or for the wiring stovepipe wire suspending connector 13 thereto. Each of the sewn cloth fabric pieces 3a, 3b, 7a and 7b, were slitted with a scissors cutting along the side margins ($7_S$ and $3_S$) and bottom margins ($3_M$ and $7_M$) by vertically cutting slits 11 about 5 cm in depth beginning at the dissecting center of the bottom margins ($3_M$ and $7_M$) and at about 1 cm lateral spacing along the bottom margins ($3_M$ and $7_M$) and side margins ($3_S$ and $7_S$) of both the white background pieces (3a and 3b) and brown inlaid pieces (7a and 7b) of cloths. The slits 9 and 11 measured about 1 cm apart and were generally cut directionally toward the bisecting center point of the top section $3_T$. The slit depth diminished to about 3 cm for uppermost slits 9 and 11 of each piece 3a, 3b, 7a and 7b.

The resultant deer tail decoy 1 was mounted upon an elevated mounting site a support 15 against a dark background bush B at a position to catch a gust of wind. It was observed that the decoy 1 creates a number of independent motions, all of which have a cooperative effect in arousing and maintaining the curiosity of a white tail deer D. The combination of suspending decoy 1 from the support of an elevated mounting site 15 with the wire supporting connector 13 imparts both a pendulum and twisting motion as decoy 1 sways in wind. These motions are representative of the communication and socializing demeanors of a deer D. In conjunction with these motions, there exists under wind blown conditions a simultaneous wavelike or undulating motion of the fabric pieces 7a, 7b, 3a and 3b in synchronization of the pendulum and twisting rotational movement, all of which motions, in combination with the fluttering of the inner and outer flaps 9F and $11_F$ create a unique contrasting of the dark flaps $9_F$ against the light flaps $11_F$ to effectively simulate the attracting characteristics of an amicable deer D. These combined motions and functional effect emulate the natural and environmental characteristics of a friendly communicative deer tail $D_1$. This allows the hunter using the decoy 1 to attract and maintain the curiosity of the animal D at an appropriate position for harvesting.

Figure 6:
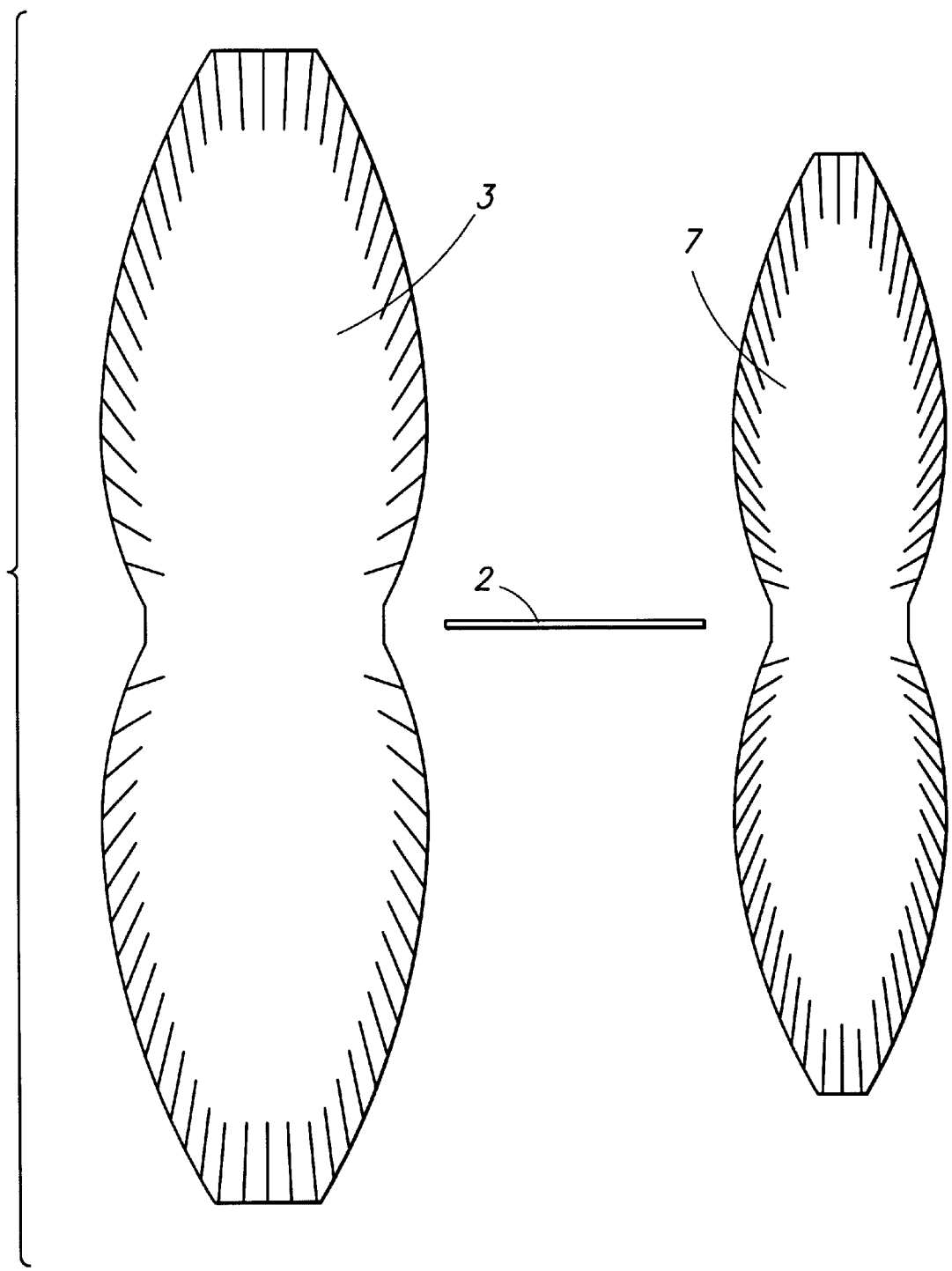
FIG. 6 is a view of another variation of disassembled pieces for making the deer tail decoy of this invention.

In a similar manner with reference to FIG. 6, the inner part 7 may be centrally positioned upon outer background material 3; then folded in a mating relationship so that the outer pattern of background material 3 rests in a back-to-back relationship, pinning the folded patterns of the background material 3 and inner part 7 and stitching as described above to provide with slitting the desired animal tail decoy 1.

The deer tail decoy 1 is highly effective in attracting and maintaining the attention of deer D.

What is claimed is:

1. An animal tail decoy which upon exposure to wind simulates motion of a wind blown tail of an animal, said animal tail decoy comprising a support member, a flexible background material having a top section secured to the support member and a bottom section of an arcuate shape containing a multiplicity of arcuate flaps positioned about a peripheral margin of the bottom section to form a multiplicity of outer flaps which are adapted to independently flutter in the wind, and a flexible inner part of a contrasting color juxtapositioned within the peripheral margin of said bottom section with said flexible inner part forming an arcuate configuration having a plurality of inner flaps arcuately aligned along a peripheral border of the flexible inner part and secured at an internally disposed position relative to the bottom section so as to permit the multiplicity of outer flaps and the plurality of inner flaps of the contrasting color to independently flutter in the wind and thereby simulate the wind blown tail of the animal.

2. The decoy according to claim 1 wherein the flexible background material and the flexible inner part consist essentially of cloth fabric.

3. The decoy according to claim 1 wherein the flexible background material comprises a white cloth fabric and the flexible inner part comprises a brown colored fabric with the decoy being of a vase-shaped pattern simulating the color and appearance of a tail of a white tail deer.

4. The decoy according to claim 3 wherein the brown colored cloth fabric is stitched onto the white colored cloth fabric at a recessed margin from the plurality of inner flaps so as to permit the inner flaps and the outer flaps to independently flutter when subjected to a blowing wind.

5. A method for emulating movement of a tail of an animal with an animal tail decoy comprising a support member, a flexible background material having a top section secured to the support member and a bottom section of an arcuate shape containing a multiplicity of arcuate flaps positioned about a peripheral margin of the bottom section to form a multiplicity of outer flaps which are adapted to independently flutter in the wind, a flexible inner part of a contrasting color juxtapositioned within the peripheral margin of said bottom section with said flexible inner part forming an arcuate configuration having a plurality of inner flaps arcuately aligned along a peripheral border of the flexible inner part and secured at an internally disposed position relative to the bottom section so as to permit the multiplicity of outer flaps and the plurality of inner flaps of the contrasting color to independently flutter when exposed to wind and a suspending connector for mounting the decoy to an elevated mounting site, said method comprising:

a) mounting the animal tail decoy to the elevated mounted site with said suspending connector b) exposing the animal tail decoy to wind so as to import partial axial motion about the suspending connector, a pendulum movement, and an undulating motion of said flexible background material, and said inner part and a fluttering of said outer and said inner flaps; and c) continuing the exposure of the animal tail decoy to the wind for a period of time sufficient to attract the attention of the animal.

* * * * *